US011724187B2

(12) United States Patent
Bean et al.

(10) Patent No.: US 11,724,187 B2
(45) Date of Patent: Aug. 15, 2023

(54) GHOST COMPARISON MODE

(71) Applicant: Sony Interactive Entertainment Inc., Tokyo (JP)

(72) Inventors: Celeste Bean, San Mateo, CA (US); Kristine Young, San Mateo, CA (US); Olga Rudi, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/483,524

(22) Filed: Sep. 23, 2021

(65) Prior Publication Data

US 2023/0092943 A1    Mar. 23, 2023

(51) Int. Cl.
*A63F 13/497*    (2014.01)
*A63F 13/537*    (2014.01)

(52) U.S. Cl.
CPC .......... *A63F 13/497* (2014.09); *A63F 13/537* (2014.09)

(58) Field of Classification Search
CPC .............................. A63F 13/497; A63F 13/537
See application file for complete search history.

(56) References Cited

U.S. PATENT DOCUMENTS

| 9,533,230 | B2* | 1/2017 | Paquet ................ A63F 13/5375 |
| 2009/0104960 | A1 | 4/2009 | Kelly et al. |
| 2009/0325690 | A1 | 12/2009 | Zhou et al. |
| 2010/0113115 | A1* | 5/2010 | Hightower ............... A63F 13/10 |
| | | | 463/43 |
| 2013/0190096 | A1* | 7/2013 | Ronen ................... A63F 13/497 |
| | | | 463/43 |
| 2014/0066191 | A1* | 3/2014 | Yang ....................... A63F 13/46 |
| | | | 463/29 |
| 2014/0187318 | A1 | 7/2014 | Gallizzi et al. |
| 2016/0228763 | A1 | 8/2016 | Huang et al. |

FOREIGN PATENT DOCUMENTS

| WO | WO 2017/058951 | 4/2017 |
| WO | WO 2023/048789 | 3/2023 |

OTHER PUBLICATIONS

PCT/US2022/034282, Ghost Comparison Mode, Jun. 21, 2022.
PCT Application No. PCT/US2022/034282 International Search Report and Written Opinioin dated Sep. 27, 2022.

* cited by examiner

*Primary Examiner* — Reginald A Renwick
(74) *Attorney, Agent, or Firm* — Polsinelli LLP

(57) ABSTRACT

A method and system for providing visual comparisons to previous gameplay is disclosed. A plurality of datasets, with each dataset associated with displaying at least a part of gameplay from a past gameplay session of an interactive content title and a set of synch points within the past gameplay session is stored. An input over a communication network from a client device of a player associated with a current gameplay session is received. The received input indicates one of the stored datasets associated with the interactive content title. An overlay for a display of the current gameplay session is generated. The overlay includes a ghost projection based on the indicated dataset. The ghost projection is superimposed over the display of a virtual environment of the current gameplay session based on the set of synch points.

15 Claims, 6 Drawing Sheets

GHOST COMPARISON MODE

BACKGROUND OF THE INVENTION

1. Field of Invention

The present invention generally relates to providing a visual comparison to previous gameplay. More specifically, the present invention relates to providing a superimposed ghost projection overlay based on a previous game session onto a display of a current gameplay session.

2. Description of the Related Art

Presently available interactive media titles, including video game titles, may track data regarding interaction by a player with media elements during an interactive session. Such tracked data may include gameplay summaries, scores, status changes, achievements, trophies, and video recordings that depict the player's performance within the in-game environment of a gameplay session. Different game titles may track different types of game data and statistics. Such game data and statistics may serve as comparison points by which users may compare their current performance with the past performances by themselves, friends, or other players of the game title. Presently available user interfaces for accessing and viewing such game data and statistics may include inter alia tables of highest scores and statistics, which may be presented external to a gameplay session or during a pause in gameplay. Captured video may likewise be viewed in a context separate from active gameplay or external to the current gameplay session.

As a result, while such game data, statistics, and video may be indicative of various difference between one gameplay session and another gameplay session, such differences and the significance thereof may not be immediately apparent to the user, particularly when the user is currently engaging in gameplay. Furthermore, such game data as gameplay summaries, scores, or trophies are static representations of gameplay and do not fully capture how certain different decisions or maneuvers may affect performance in the gameplay session. Thus, presently available data tracking systems do not provide for real-time comparisons of current gameplay sessions against past gameplay sessions, thereby preventing the player from being able to fully appreciate the differences between the gameplay sessions in real-time during the course of the gameplay session in which the player is currently engaged.

Therefore, there is a need to provide a service that provides an overlay in a current gameplay session, wherein the overlap includes a ghost projection associated with a past gameplay session that align based on common synch points across the current and past gameplay sessions.

SUMMARY OF THE CLAIMED INVENTION

A method for providing visual comparisons to previous gameplay is disclosed. The method may include storing a plurality of datasets each including datasets associated with displaying at least a part of gameplay from a past gameplay session of an interactive content title and a set of synch points within the past gameplay session. The method may also include receiving an input over a communication network from a client device of a player associated with a current gameplay session. The received input may indicate one of the stored datasets associated with the interactive content title. The method may further include generating an overlay for a display of the current gameplay session. The overlay may include a ghost projection based on the indicated dataset. The method may include superimposing the ghost projection over the display of a virtual environment of the current gameplay session based on the set of synch points.

A system for providing visual comparisons to previous gameplay is disclosed. The system includes a memory and a processor that executes instructions stored in memory, wherein execution of the instructions by the processor may store a plurality of datasets each including datasets associated with displaying at least a part of gameplay from a past gameplay session of an interactive content title and a set of synch points within the past gameplay session. The execution of the instructions by the processor also may cause to receive an input over a communication network from a client device of a player associated with a current gameplay session. The received input may indicate one of the stored datasets associated with the interactive content title. The execution of the instructions by the processor also may generate an overlay for a display of the current gameplay session, wherein the overlay includes a ghost projection based on the indicated dataset. The execution of the instructions by the processor also may cause to superimpose the ghost projection over the display of a virtual environment of the current gameplay session based on the set of synch points.

A non-transitory computer-readable storage medium, having embodied thereon a program executable by a processor to perform a method for providing visual comparisons to previous gameplay is disclosed. The method may include storing a plurality of datasets each including datasets associated with displaying at least a part of gameplay from a past gameplay session of an interactive content title and a set of synch points within the past gameplay session. The method may also include receiving an input over a communication network from a client device of a player associated with a current gameplay session. The received input may indicate one of the stored datasets associated with the interactive content title. The method may further include generating an overlay for a display of the current gameplay session. The overlay may include a ghost projection based on the indicated dataset. The method may include superimposing the ghost projection over the display of a virtual environment of the current gameplay session based on the set of synch points.

DETAILED DESCRIPTION

Embodiments of the present invention include systems and methods for providing an overlay including a superimposed ghost projection associated with a past gameplay session over a display of a virtual environment of a current gameplay session. The method may include storing a plurality of datasets each including datasets associated with displaying at least a part of gameplay from a past gameplay session of an interactive content title and a set of synch points within the past gameplay session. The method may also include receiving an input over a communication network from a client device of a player associated with a current gameplay session. The received input may indicate one of the stored datasets associated with the interactive content title. The method may further include generating an overlay for a display of the current gameplay session. The overlay may include a ghost projection based on the indicated dataset. The method may include superimposing the ghost projection over the display of a virtual environment of the current gameplay session based on the set of synch points.

Figure 1:
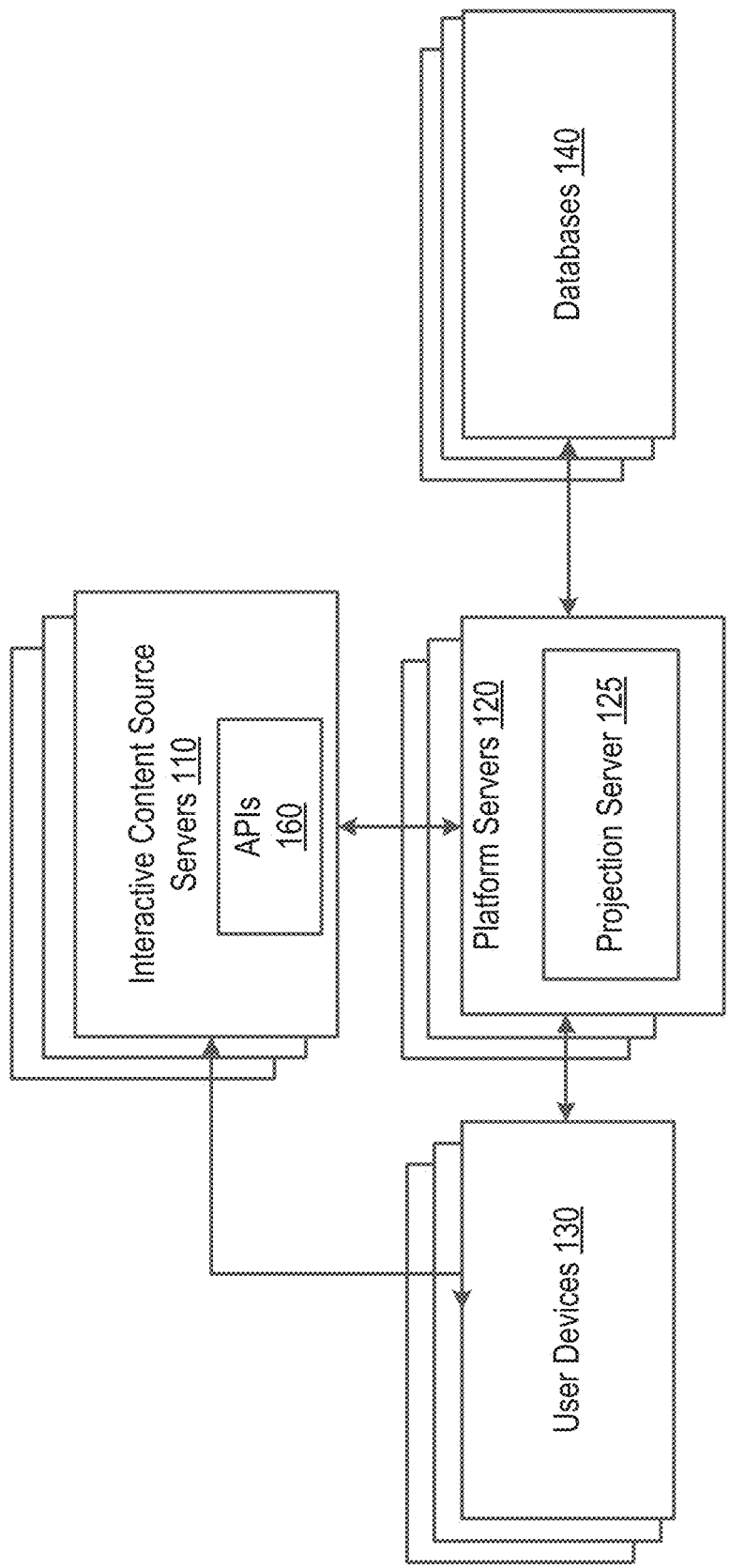
FIG. 1 illustrates an exemplary network environment in which a system for providing visual comparisons to previous gameplay may be implemented.

FIG. 1 illustrates an exemplary network environment in which a system for providing a custom training curriculum may be implemented. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIG. 2.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, mechanic information, game media information, etc.) displayed during at least a portion of the streaming media.

The platform servers 120 may include a projection server 125 that receives datasets associated with past gameplay sessions that may be linked to respective milestones and/or activities and may generate an overlay for a display of a current gameplay session. The overlay may include a ghost projection based on the received datasets. The ghost projection may be superimposed over the display of the virtual environment based a set of synch points. The ghost projection may be translucent, a different color, or a transformed visualization that indicates that the ghost projection is not part of the current gameplay session and cannot be contacted or effect the current gameplay session. The set of synch points may be associated with timestamps, in-game locations, events, object data, or any datapoint associated with a point in time, location, or activity in a virtual environment of a game title. The set of synch points may be sufficient for the ghost projection to be placed in the virtual environment in a same location and manner as the controlled character played in the past gameplay session that the ghost projection is recreating.

The virtual environment may be a 2D or a 3D environment. For a 2D environment, synching the virtual environment of the past gameplay session and the current gameplay session, along with timestamps associated with certain points of play may be sufficient to superimpose the ghost projection. For a 3D environment, the datasets associated with the past gameplay session may be sufficient to generate a complete 3D rendering of the controlled character and changes or effects to NPCs and the virtual environment based on actions of the controlled character. As such, an angle of display in the current gameplay session may be different from that of the past gameplay session. Therefore, a change in angle of display between the past gameplay session and the current gameplay session may be calculated and used to generate a new view of the 3D rendering of the controlled character and changes or effects to NPCs and the virtual environment based on actions of the controlled character for the current gameplay session.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). The user device may include one or more devices associated with a user or a user device capable of displaying on one or more screens.

The databases 140 may be stored on the platform servers 120, the media streaming servers 110, any of the servers 218 (shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in or interact with. One or more user profiles may also be stored in the databases 140. Each user profile may include information about the user (e.g., user progress in an activity and/or media content title, user id, user game characters, etc.) and may be associated to media.

In an exemplary embodiment of the present invention, platform servers 120 may capture data regarding current gameplay sessions. One current gameplay session may include a user using user device 130 to access and engage with an interactive content title hosted by interactive content servers 110. During gameplay of a particular game title, for example, platform servers 120 may record gameplay data (including video, metadata regarding in-game status and actions, etc.) sufficient to recreate the gameplay of a current gameplay session in a future gameplay session. Data regarding the particular in-game activity may also be captured (and described in further detail in relation to FIG. 2) and stored in database(s) 140. Data regarding the same activity occurring across different gameplay session may include one or more synch points in common. Such synch points may be associated with the same in-game levels, location, game characters, game objects, events, and any other element of the digital environment of the game title. For example, such synch points may include certain in-game landmarks, battles, obstacles, etc., and may be identified using any combination of image analysis, sound analysis, game data analysis, or metadata analysis. Thus, specific points within a gameplay session may be identified as synch points, which may further be used to match different media files (e.g., video files) of different gameplay sessions that depict the same or similar occurrences within the digital or virtual environment. Furthermore, as a current gameplay session progresses, a next synch point may be reached. As such, the ghost projection may reset to display the ghost projection on-screen when the next synch point is reached, while display an indication of a time difference or score difference for when the ghost projection reached that next sync point (see FIG. 4 for more details pertaining to the time difference indication).

In an exemplary implementation, databases 140 may store information regarding a plurality of past and current gameplay sessions, including the synch points that have been identified within each corresponding media file. Platform servers 120 may further analyze gameplay data from a current gameplay session associated with a specific player in real-time to identify when the synch points occur and to compare data associated with the identified synch points to corresponding synch points in one or more media files associated with past gameplay sessions. Such analysis may further include evaluation in comparison to historical gameplay data and metadata of the same player or of other players of the same or similar game titles as stored in databases 140. In some embodiments, the player may request on-screen comparison by made to specified gameplay sessions, including their own past sessions (e.g., personal best scores or records), as well as gameplay sessions associated with friends, teammates, record-holders, or other notable players of the game title.

The player may also select or otherwise specify parameters for selecting which player(s) and associated gameplay session(s) to use for the on-screen comparison. For example, the player may have searched for, watched, or been recommended certain media files associated with past gameplay sessions, as well as bookmarked or otherwise designated certain gameplay sessions to use for on-screen comparisons. The media files of the bookmarked or designated gameplay sessions may therefore be saved to a user profile of the player and presented as a menu to the player at the start or during the current gameplay session. In some implementations, the search parameters used by the player may be saved and used to dynamically update the menu in real-time as new media files are being captured and current gameplay conditions change. The dynamically updated menu may therefore reflect the media files identified as being the most relevant to the specific player in real-time with the current gameplay session. For example, the player may have expressly designated certain in-game factors (e.g., experience level, skill level, duration of time spent at the identified in-game point as being of interest), as well as indirectly designated such factors (e.g., based on real-world data regarding real-time reactions by the player). The platform servers 120 may use the activity data to determine how well the player performed in various activities or tasks to determine which past gameplay sessions to generate an on-screen comparison.

An exemplary on-screen comparison may include a generated overlay based on identified media file(s), which may be synchronized to the display of the current gameplay session based on corresponding synch points. Because every gameplay session may be different based on the specific actions by the respective participating player(s), the media files associated with the different gameplay sessions may not depict the same in-game activities at the same time. For example, one player may wander around the in-game environment for an extended period of time before encountering a particular creature or landmark associated with particular activity (e.g., battle or challenge), while another player may stumble on the same creature or landmark more quickly. The creature or landmark may be identified as a synch point, so that a player may be presented with the media file of the corresponding activity in real-time with the specific activity in which they are engaging in the current gameplay session. In some embodiments, a predetermined time offset may be used to provide the user with a preview as to what happened in the media file and how the depicted player-character responded before the current player encounters the same in-game situation.

As discussed in further detail herein, the on-screen comparison may include an overlay that includes a ghost projection in which the identified media file is made transparent or translucent and presented side-by-side with the display of the current gameplay session. Because the play of the media file is synchronized according to the corresponding synch points, the generated overlay presents the player with a visual comparison of corresponding actions during the gameplay session depicted by the identified media file(s) in relation to each synch point. Some implementations of the generated overlay may further include specific differences identified by the platform server 120, which may compare the game data and metadata of the current gameplay session to the associated game data and metadata of the gameplay session depicted by the identified media file(s). The platform server 120 may perform such comparison and identification of specific differences in relation to scores, choices made (e.g., chosen weapons, spells, moves, maneuvers, etc.), performance metrics (e.g., character speed, health, strength, power), etc. The player may specify preferences regarding which comparisons to include in the overlay, as well as preferences as to how the comparative data may be presented within the overlay in conjunction with the ghost projection.

Figure 2A:
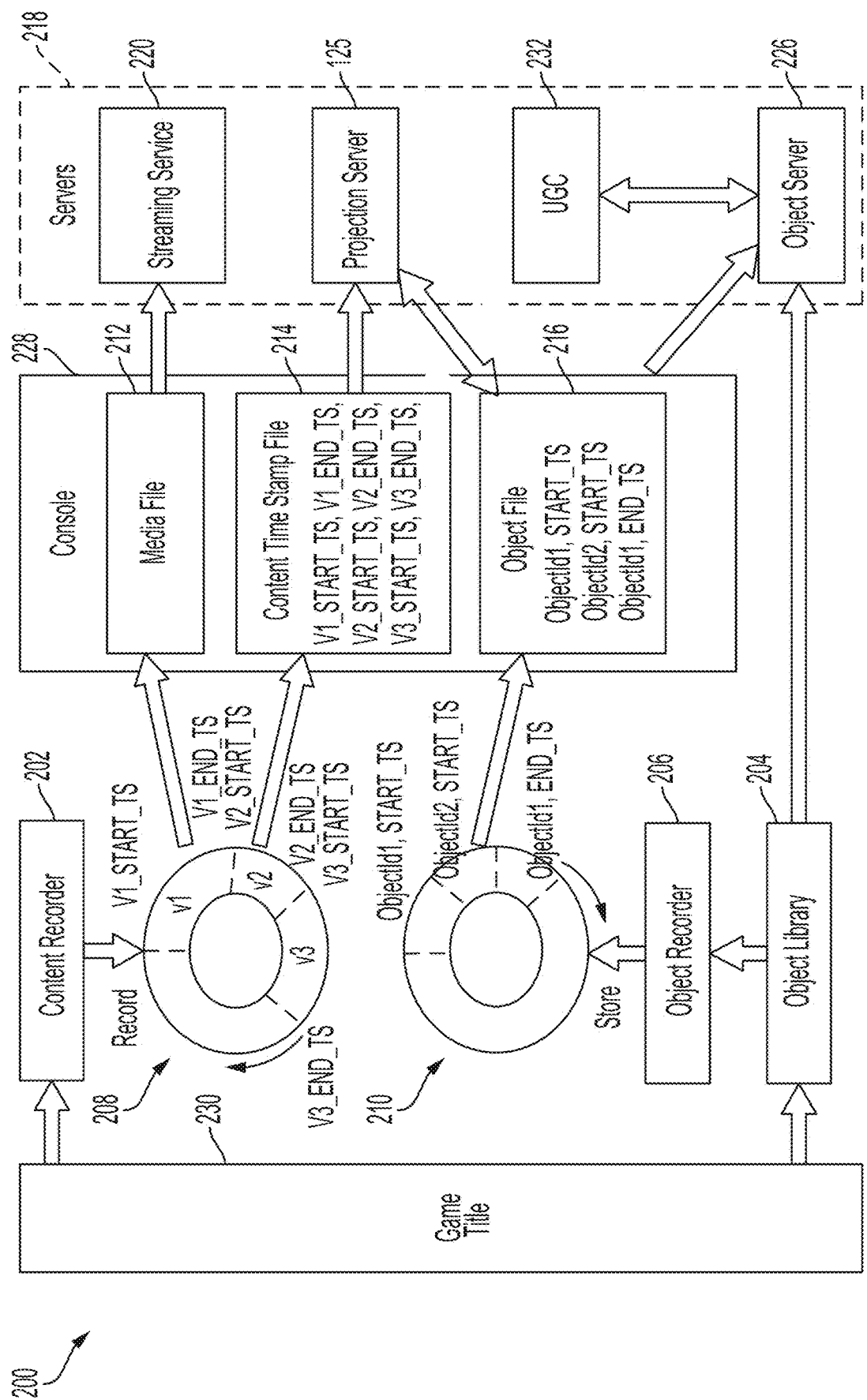
FIG. 2A illustrates an exemplary uniform data system (UDS) that may be used to provide data to a system for providing visual comparisons to previous gameplay.

FIG. 2A illustrates an exemplary uniform data system (UDS) that may be used to provide data to a system for providing visual comparisons to previous gameplay. Based on data provided by UDS, the projection server 125 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 130) and exemplary servers 218 (e.g., streaming server 220, the projection server 125, a user-generated content (UGC) server 232, and an object server 226) are shown. In one example, the console 228 may be implemented on the platform servers 120, a cloud server, or on any of the servers 218. In an exemplary example, a content recorder 202 may be implemented on the platform servers 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be sent to the projection server 125 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform servers 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the object data onto an object ring-buffer 210 (e.g., ObjectID1, START_TS; ObjectID2, START_TS; ObjectID3, START_TS). Such object data recorded onto the object ring-buffer 210 may be stored in the object file 216. Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

The activity files captured by UDS 200 may be accessed by the platform servers 120 as to the user, the game title, the specific activity being engaged by the user in a game environment of the game title, and similar users, game titles, and in-game activities. Such data may be compared to data from the current gameplay session to identify with granularity how the user may be struggling. For example, the platform servers 120 may identified that players successfully engaging in the same activity may have performed a particular move associated with a specific combination of input, while also identifying that user input appears to be similar but does not quite match the specific combo. The platform servers 120 may therefore filter the available training materials to identify the materials relevant to the specific combo (e.g., controller layout with the specific input buttons marked or numbered, video of past players who used the combo, tips associated with the combo). The filtered training materials may further be provided to the user in accordance with a profile that includes express preferences and historical habits.

Figure 2B:
FIG. 2B illustrates an exemplary table of various objects and associated events.

As shown in the exemplary table 250 of FIG. 2B, such object data (e.g., the object file 216) may be associated with event information regarding activity availability change and may be related to other objects with associated event information. For example, such object data may be zone data files 252, actor data files 254, mechanics data files 256, game media data files 258, and other gameplay-related data files.

Such object data (e.g., the object file 216) may be categorized as in in progress, open-ended, or competitive. Such object data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such object data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4x4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform servers 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform servers 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform servers 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g., fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Object data (e.g., activity data, zone data, actor data, mechanics data, etc.) may be associated with one another to form object-object associations. The object data may also be associated with the media files (e.g., media file 212) and for media-object bindings. These object-object associations and media-object bindings, along with other associations made with respect to aspects (e.g., activities, actors, actions, etc.) displayed in the media, may indicate particular patterns such that future object data may be predicted based on such associations that form object aggregations. Object aggregations may form one or more relationships between the object data through algorithms, logic functions, statistical analysis, and other dataset analyses.

Figure 3:
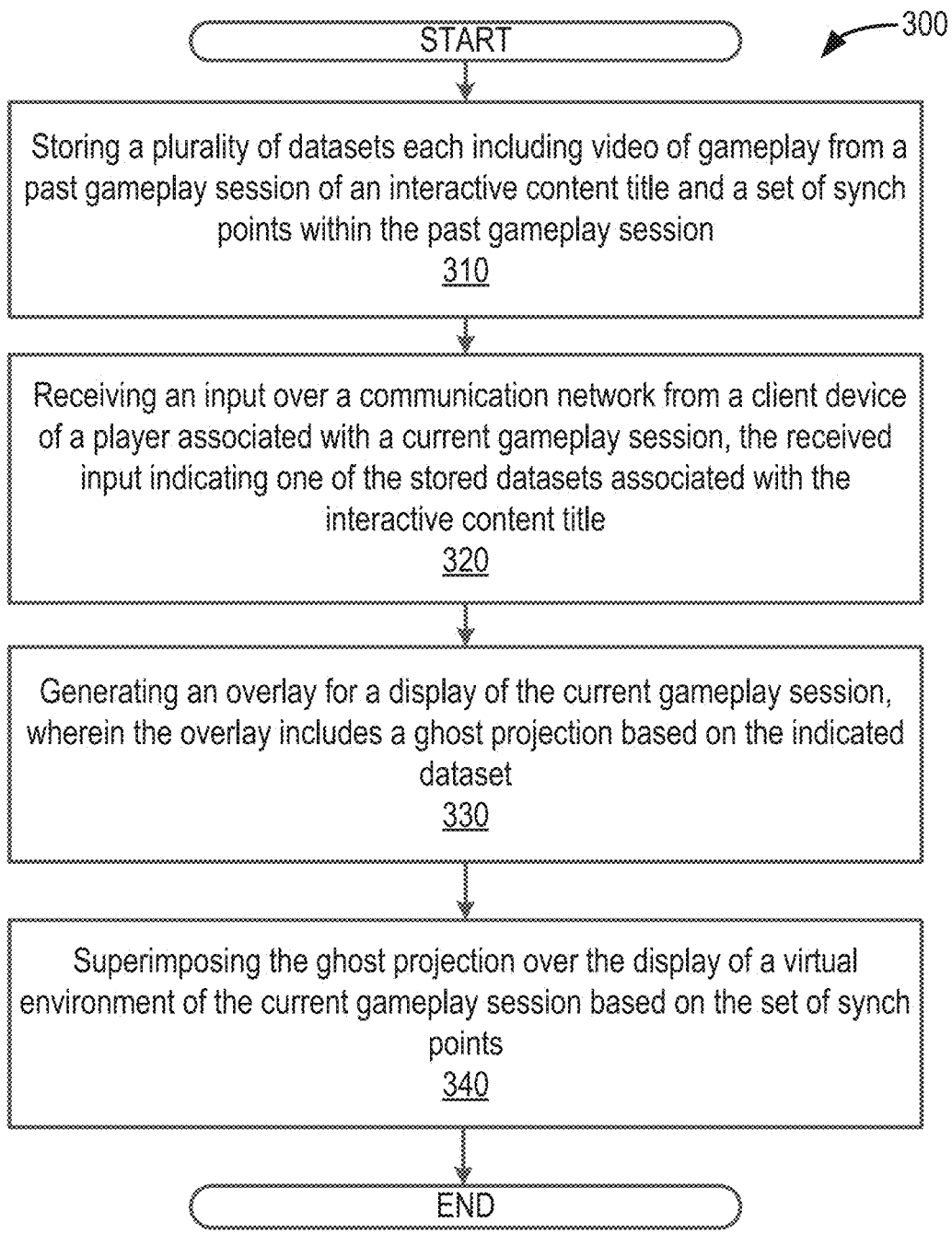
FIG. 3 is a flowchart illustrating an exemplary method for providing visual comparisons to previous gameplay.

FIG. 3 is a flowchart illustrating an exemplary method 300 for visual comparisons to previous gameplay, according to some aspects of the present disclosure. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device.

In step 310, a plurality of datasets may be stored, each dataset may include datasets associated with displaying at least a part of a gameplay from a past gameplay session of an interactive content title and a set of synch points within the past gameplay session. The datasets associated with displaying at least a part of the gameplay may be limited to recreating a character that the player controls and its actions. The datasets may also include recreating transformations in the virtual environment, including actions of non-player characters, based on the actions of the character.

In step 320, an input may be received over a communication network from a client device of a player associated with a current gameplay session. The received input may be associated with a particular activity, location in a virtual environment of the interactive content title, or one of the starting points of the interactive content title for the current gameplay session. The particular activity, location in the virtual environment of the interactive content title, or starting point may be associated with past gameplay sessions that overlap with respect to the activity, location in the virtual environment, or starting point. As such, the received input may indicate one of the stored datasets associated with past gameplay sessions with the interactive content title. The stored datasets may include data sufficient to recreate parts of the past gameplay session, such as the character that was controlled by the player in the past gameplay session as the character moves through the virtual environment.

In step 330, an overlay may be generated for the display of the current gameplay session. A ghost projection may be generated based on the indicated dataset associated with the past gameplay session. The ghost projection may include the character and may also include effects on the virtual environment and/or NPCs based on the actions of the character. The ghost projection may be added in an overlay to the display of the current gameplay session.

In step 340, the ghost projection may be superimposed over the display of the virtual environment of the current gameplay session based on the set of synch points. The set of synch points may align the ghost projection with the virtual environment in a manner that reflects how the past gameplay session was played. The set of synch points may be based on at least one of timestamps, in-game locations, events, object data, or any datapoint associated with a point in time, location, or activity in the virtual environment of the interactive content title.

In some embodiments, a display of one or more game options may be generated. The one or more options may be for competing against one of the past gameplay sessions. The input may include a selection from the display. For example, the one or more game options may distinguish various activities, levels, or challenges that are available to re-play. Each of the one or more game options may be associated with one or more past gameplay sessions. In other words, the selection of one of the game options may be associated with both an activity, level, or challenge that is re-playable and also with how the player played in the activity, level, or change in a particular past gameplay session. How the player played may be associated with certain milestones that the player reached in the past gameplay sessions. Therefore, the selection may be associated with a milestone reached in the past gameplay session.

In some embodiments, the stored dataset may include one or more gameplay attributes associated with the past gameplay session. The gameplay attributes associated with the past gameplay session may be compared with gameplay attributes associated with the current gameplay session to identify one or more differences. Such identified differences may be included in an update of the display of the current gameplay session. Identified differences may be based on calculation and comparisons of speed, points earned, complexity in gameplay, biometric data measurements taken during gameplay, or any kinds of quantifiable comparison between the two sessions that can distinguish the gameplay of the two sessions.

In some embodiments, a notification may be generated, the notification including metrics about the past gameplay session and an option selectable to initiate a competition against the past game session. The input may include selecting the option. The notification may be generated based on a metric analysis of the player based on one or more recent gameplay sessions. For example, the metric analysis may indicate that the player has been trying to replay a same past mission that the player had previously received a milestone or trophy for. By suggesting that the player play that same past mission, but with a ghost projection indicative of their past gameplay, the player may be given visual hints as to where and when the player needed to improve their gameplay to meet or beat their previous gameplay session.

Figure 4:
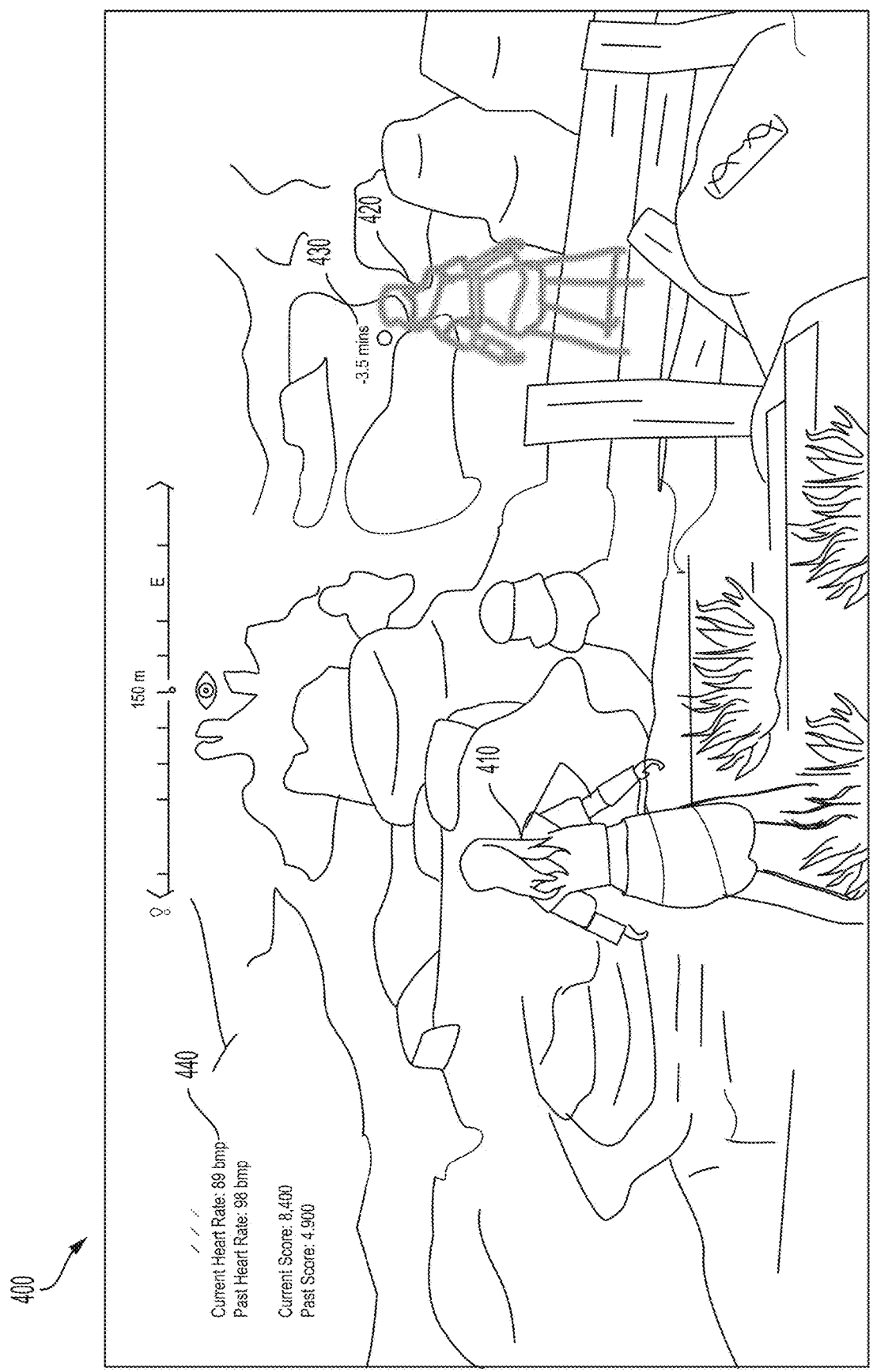
FIG. 4 illustrates an exemplary graphical user interface (GUI) in which a ghost projection of a past gameplay session is superimposed during a current gameplay session.

In some embodiments, the past gameplay session may be associated with a different player, such as a friend or a worldwide champion. Being able to play within a same virtual environment provides a more visual comparison for players to gauge where they can improve and learn from past gameplay session in a more granular and visual fashion. FIG. 4 illustrates an exemplary graphical user interface (GUI) in which a ghost projection associated with a past gameplay session is displayed in an overlay of a current gameplay session. In some embodiments, such as in a display 400 depicted in FIG. 4, a view of the virtual environment may be from a third-person perspective behind a player-controlled character 410. The view may also be an eagle eye view, a first-person perspective, a side perspective, etc. If the ghost projection is determined to be in the view of the virtual environment, the projection server 125 may generate a version of the ghost projection 420 that aligns with the view of the virtual environment. For example, as shown in FIG. 4, the view if from a third-person perspective behind the player-controlled character 410 of the current gameplay session and the ghost projection 420 is ahead of the player-controlled character 410. The ghost projection 420 may be ahead because in the past gameplay session, the player moved quicker and the synch point between the current gameplay session and the past gameplay session is based on a same first starting point at a first location in the virtual environment. However, the synch point may also be based on other gameplay aspects or attributes. For example, the synch point may be based on once a certain activity has been completed, and that activity could have been completely at different parts in the virtual environment and the display 400 of the virtual environment may merely have an arrow and distance notation indicating where the previously player-controlled character is located in the virtual environment.

In some aspects, the synch point may update throughout the gameplay session and the ghost projection 420 may jump in time to a new synch point that is more relevant to the activity that the player-controlled character 410 is engaged in. For example, the object data may indicate that the player-controlled character 410 has completely a first part of a quest and now has moved on to a second part of a quest. In the past gameplay session, the previous player-controlled player may have reached that second part of the quest much quicker or slower than the player-controlled character 410 such that if the gameplay were only synched by a first synch point at the start of the game, the ghost projection 420 would not visible in the virtual environment of the player-controlled character 410. Therefore, a second synch point may re-synch the ghost projection 420 to a point in play of the past gameplay session based on when both finished the first part of the quest. The display of the ghost projection 420 may generate an indication 430, such as a plus or minus in time, to denote that while you see the ghost projection 420, there is a time difference between the two sessions.

In some aspects, the display 400 including the virtual environment may include points of comparison 440 between the past gameplay session associated with the ghost projection 420 and the present gameplay session. The points of comparison 440 may range from their scores and how they performing in the game to external factors, such as their biometric data recorded during gameplay.

Figure 5:
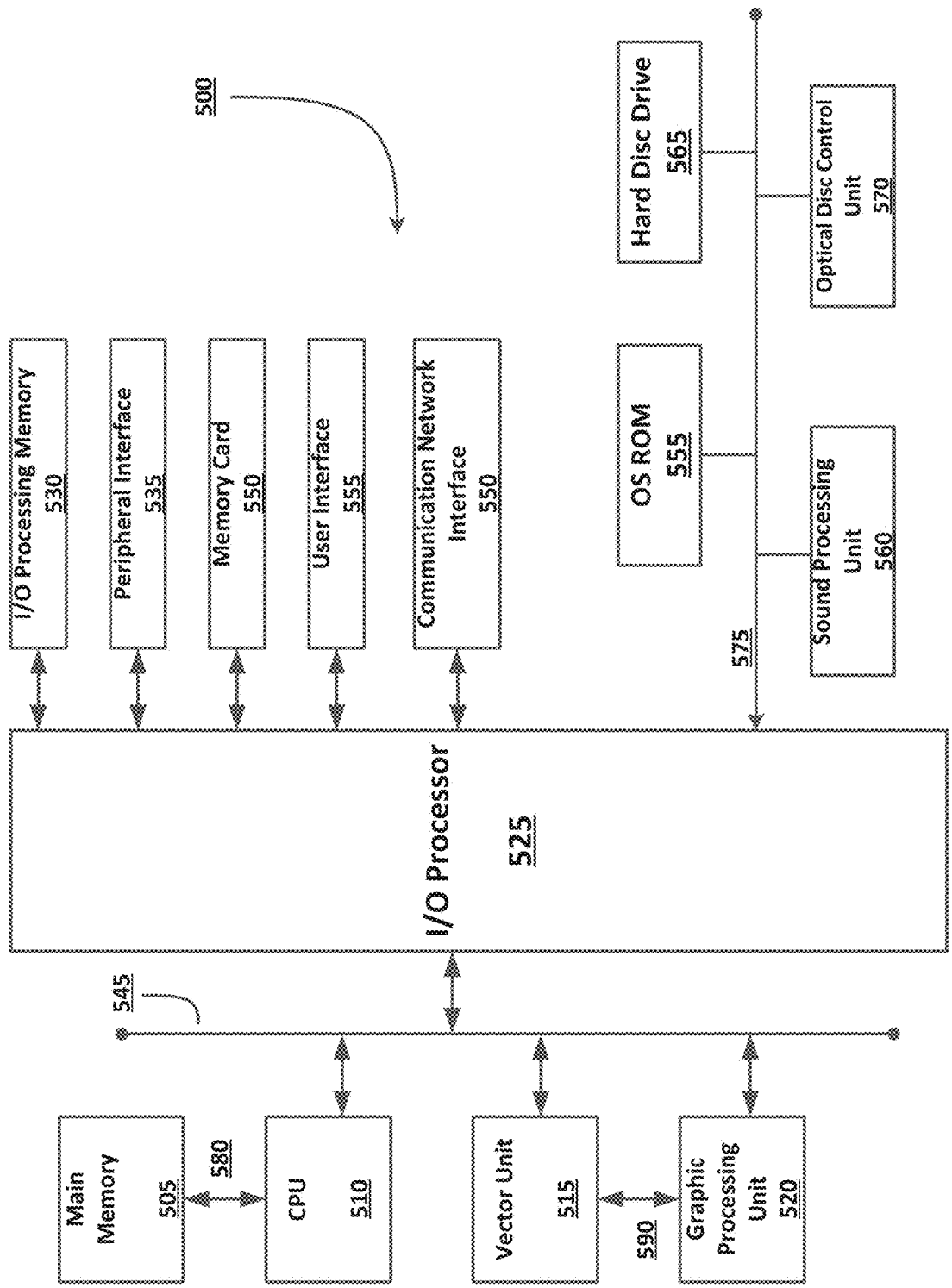
FIG. 5 is a block diagram of an exemplary electronic entertainment system, according to some aspects of the present disclosure.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 594 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method. for providing visual comparisons to previous gameplay, the method comprising:
   storing a plurality of datasets each including video of gameplay from different gameplay sessions of an interactive content title and a set of synch points within each different gameplay session;
   receiving an input over a communication network from a client device of a player associated with a current gameplay session, the received input corresponding to one of the stored datasets associated with an indicated one of the gameplay sessions of the interactive content title;
   generating an overlay for a display of the current gameplay session, wherein the overlay includes a ghost projection based on the video from the dataset of the indicated gameplay session; and
   superimposing the ghost projection over the display of a virtual environment of the current gameplay session, Wherein the ghost projection is synchronized to the display based on matching one of the synch points from the dataset of the indicated gameplay session to corresponding gameplay data of the current gameplay session.

2. The method of claim 1, further comprising generating a display of one or more game options for competing against one of the different gameplay sessions, wherein the input includes a selection from the display.

3. The method of claim 2, wherein at least one of the options is associated with one or more milestones associated with an activity of the interactive content title.

4. The method of claim 1, wherein the stored dataset further includes one or more gameplay attributes associated with the indicated gameplay session, and further comprising:
comparing the gameplay attributes associated with the indicated gameplay session to gameplay attributes associated with the current gameplay session to identify one or more differences; and
updating the display of the current gameplay session to include the identified differences.

5. The method of claim 4, wherein the gameplay attributes include biometric data measurements taken during gameplay.

6. The method of claim 1, further comprising generating a notification that includes metrics about the indicated gameplay session and an option selectable to initiate a competition against the indicated gameplay session, wherein the input includes selecting the option.

7. The method of claim 6, wherein the notification is generated based on a metric analysis of the player based on one or more recant gameplay sessions.

8. A system for providing visual comparisons to previous gameplay, comprising:
memory that stores a plurality of datasets each including video of gameplay from different gameplav sessions of an interactive content title and a set of synch points within each different gameplay session;
a communication interface that receives an input over a communication network from a client device of a player associated with a current gameplay session, the received input corresponding to one of the stored datasets associated with an indicated one of the gameplav sessions of the interactive content title; and
a processor that executes instructions stored in memory, wherein the processor executes the instructions to:
generate an overlay for a display of the current gameplay session, wherein the overlay includes a ghost projection based on the video from the dataset of the indicated gameplay session, and
superimpose the ghost projection over the display of a virtual environment of the current gameplay session, wherein the ghost projection is synchronized to the display based on matching one of the synch points from the dataset of the indicated gameplay session to corresponding gameplay data of the current gameplay session.

9. The system of claim 8, wherein the processor executes further instructions to generate a display of one or more game options for competing against one of the different gameplay sessions, wherein the input includes a selection from the display.

10. The system of claim 9, wherein at least one of the options is associated with one or more milestones associated with an activity of the interactive content title.

11. The system of claim 8, wherein the stored dataset further includes one or more gameplay attributes associated with the indicated gameplay session, wherein the processor executes further instructions to:
compare the gameplay attributes associated with the indicated gameplay session to gameplay attributes associated with the current gameplay session to identify one or more differences; and
update the display of the current gameplay session to include the identified differences.

12. The system of claim 11, wherein the gameplay attributes include biometric data measurements taken during gameplay.

13. The system of claim 8, wherein the processor executes further instructions to generate a notification that includes metrics about the indicated gameplay session and an option selectable to initiate a competition against the indicated gameplay session, wherein the input includes selecting the option.

14. The system of claim 13, wherein the notification is generated based on a metric analysis of the player based on one or more recent gameplay sessions.

15. A non-transitory, computer-readable storage medium comprising instructions executable by a computing system to perform a method for providing visual comparisons to previous gameplay, the method comprising:
storing a plurality of datasets each including video of gameplay from different gameplay sessions of an interactive content title and a set of synth points within each different gameplay session;
receiving an input over a communication network from a client device of a player associated with a current gameplay session, the received input corresponding to one of the stored datasets associated with an indicated one of the gameplay sessions of the interactive content title;
generating an overlay for a display of the current gameplay session, wherein the overlay includes a ghost projection based on the video from the dataset of the indicated gameplay session; and
superimposing the ghost projection over the display of a virtual environment of the current gameplay session, wherein the ghost projection is synchronizedto the display based on matching one of the synch points from the dataset of the indicated gameplay session to corresponding gameplay data of the current gameplay session.

* * * * *